Nov. 24, 1970     G. B. GORDON     3,543,154

LOGIC PROBE

Filed Nov. 1, 1968

INVENTOR
GARY B. GORDON

BY    A. C. Smith

ATTORNEY

United States Patent Office 3,543,154
Patented Nov. 24, 1970

3,543,154
LOGIC PROBE
Gary B. Gordon, Cupertino, Calif., assignor to Hewlett-Packard Company, Palo Alto, Calif., a corporation of California
Filed Nov. 1, 1968, Ser. No. 772,579
Int. Cl. G01r 19/00, 31/02
U.S. Cl. 324—102   3 Claims

ABSTRACT OF THE DISCLOSURE

A miniature probe is provided with an indicator and associated circuitry for analyzing logic states of a circuit under test and for producing a visible indication of nanosecond pulses that represent the logic states being analyzed.

BACKGROUND OF THE INVENTION

Circuit tests on logic circuits are commonly performed using test instruments such as voltmeters or oscilloscopes which provide indications of pulses and the levels of logic signals that are present in the circuit under test. The use of these instruments usually require an operator to select a test point in the circuit under test, then divert his attention to the test instrument to make triggering or other operating adjustments, and then finally observe the measurement indication on the test instrument. Testing of a circuit in this manner is usually quite tedious and time consuming and highly susceptible to errors, particularly in miniaturized circuits, because the operator's attention cannot be focused on the actual test point in the circuit under test while he is observing the measurement indication on the test instrument.

SUMMARY OF THE INVENTION

Accordingly, the probe of the present invention includes a visual indicator located closely adjacent the test point of the probe so that an operator may maintain his attention focused on the circuit being tested and still be able to observe the measurement indication. The probe also includes logic-state analyzing circuitry for producing the desired visual indication.

DESCRIPTION OF THE PREFERRED EMBODIMENTS

Figure 1:
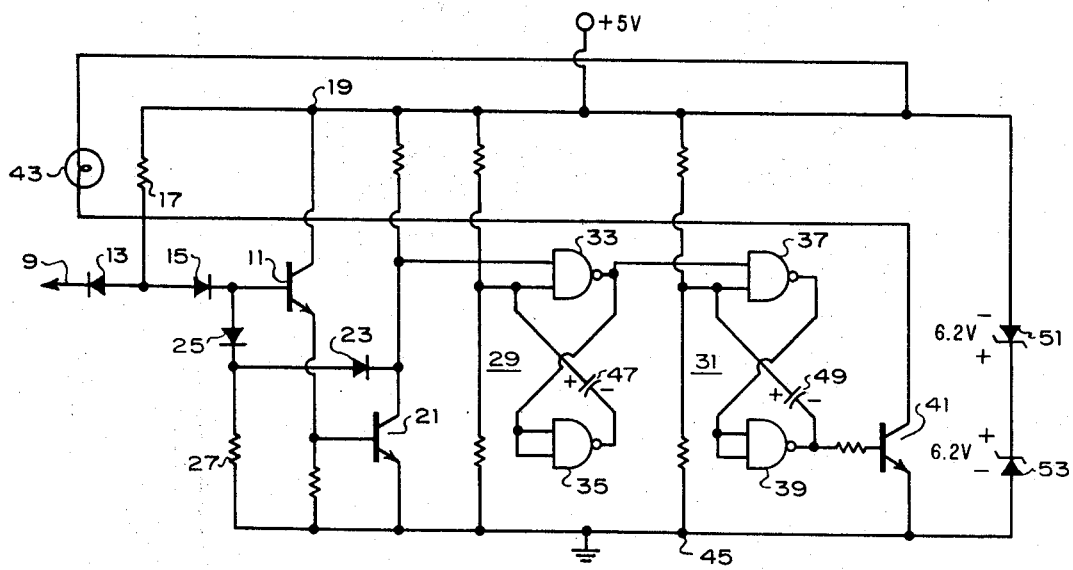
FIG. 1 is a schematic diagram of the probe circuit according to one embodiment of the present invention.

Referring now to FIG. 1, there is shown a circuit diagram of the logic-state analyzing circuitry of the probe. The input 9 is a needle-like electrode which is connected to the base of transistor 11 through the oppositely-poled, serially connected diodes 13, 15. Resistor 17 connected between the common connection of the diodes 13 and 15 and one terminal 19 of the power supply provides bias current to the diodes 13 and 15 which thus provide positive voltage applied to the input 9 back biases diode 13, and high negative voltages applied to the input 9 back biases diode 15, thus preventing damage to the following circuitry.

An amplifier including the transistor 11 and transistor 21 increases the power level of signals applied to the input 9. Transistor 11 is connected in the common collector configuration and transistor 21 is connected in the common emitter configuration and the two transistors are cascaded together for forward signal gain. Diodes 23 and 25 and the resistor 27 form a non-linear negative feedback signal path from the output on the collector of transistor 21 to the input base of transistor 11 that increases the feedback ratio with increasing signal level. This prevents saturation of the amplifier on high level signals and thus enables the amplifier to respond to fast, narrow pulses of the order of a few nanoseconds pulse width. The threshold triggering level of the circuitry is determined by the additive base-emitter junction drops in transistors 11 and 21 in combination with the diminutive drop across one diode 15, and typically is set at about 1.4 volts with respect to ground 45.

Figure 2:
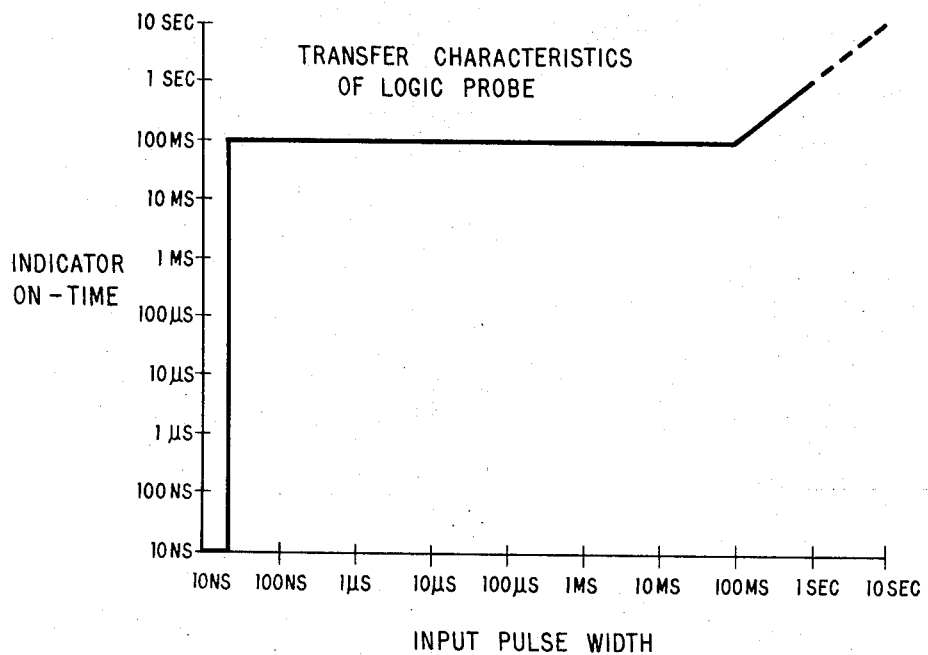
FIG. 2 is a graph showing the pulse-responsive characteristics of the circuit of FIG. 1.

The amplified signal on the collector of transistor 21 is applied to a bipolar pulse stretcher which includes the cascaded conventional monostable multivibrators 29 and 31 that are formed using capacitors 47, 49 in the cross connections between pairs of AND-NOT (or NAND) gates 33, 35, and 37, 39. These monostable multivibrators have a relaxation time of about 100 milliseconds and act as pulse stretchers and also as signal inverting circuits so that the output of the last gate 39 is always the same polarity as the pulse applied to the input of gate 33 but is of minimum duration, as shown in the graph of FIG. 2. As used in this description, a positive pulse is a pulse which attains a level more positive than the threshold triggering level, and a negative pulse is a pulse which attains a level more negative than the threshold triggering level. Specifically, a short negative pulse longer than about 20 nanoseconds produces a long positive pulse of about 100 milliseconds at the output of multivibrator 29 and this long positive pulse is inverted by the multivibrator 31 to produce a negative pulse of about 100 millisecond duration. However, a short, positive pulse (longer than about 20 nanoseconds) is merely inverted by multivibrator 29 and the resulting short negative pulse applied to multivibrator 31 produces a positive pulse of about 100 milliseconds at the output of gate 39. This gate output is used to initiate a visible indication (lasting at least 100 milliseconds) on short inputs of the order of a few nanoseconds and of either polarity. The output of the multivibrator 31 is applied to the input base of transistor 41 which has its collector-emitter current path serially connected with an indicator lamp 43 between terminals 19 and 45 of the power supply. Thus, the base of transistor 41 receives a positive signal (for the NPN-type transistor shown) for at least 100 milliseconds for each pulse of positive polarity applied to the input 9. This increases the conductivity of transistor 41 which causes the indicator lamp 43 to light momentarily. Similarly, the base of transistor 41 receives a negative signal for negative input pulses, thus causing the indicator lamp 43 to extinguish momentarily. The lamp 43 is physically disposed close to the input electrode 9 so that light indicative of a pulse present at the input 9 is visible closely adjacent the input electrode. Thus, light momentarily produced by lamp 43 indicates both the presence and positive polarity of a pulse at input 9 and light from lamp 43 momentarily extinguished indicates both the presence and negative polarity of a pulse at input 9.

Input pulses of either polarity applied to the input 9 having pulse widths longer than the relaxation time of the multivibrators 29 and 31 merely produce the requisite positive signal at the output of gate 39 for the duration of the input pulse. This is because, at the end of the relaxation time of the multivibrators 29 and 31 (determined by the capacitors 47, 49 and the equivalent resistance at their terminals), the pairs of gates 33, 35 and 37, 39 provide continuous signal inversion (when necessary). The resuting on-time of the indicator lamp 43 for pulses of varying width applied to input 9 is shown in the graph of FIG. 2. The minimum on-time of about 100 milliseconds is sufficiently long to be perceived by an operator as a pulse of light but is sufficiently short to follow most changes in logic states encountered during circuit testing. Zener diodes 51 and 53 are serially connected in polarity opposition across the terminals 19 and 45 of the power supply to provide protection against overvoltage. The present probe may thus be conveniently powered by the circuit under test or by any other convenient power supply such as a battery contained within the probe.

I claim:

1. Signalling apparatus comprising:
   triggering level threshold circuitry for establishing a predetermined triggering level relative to ground and for providing one of two output levels dependent on whether applied input pulses having positive or negative polarities with respect to the triggering level have a value above or below said triggering level,
   pulse stretching means responsive to a pulse from the threshold circuitry of either polarity with respect to the triggering level for producing an output of longer duration than the pulse applied thereto;
   indicator means connected to receive the output from said pulse stretching means for producing an output indication in response to said output applied thereto.

2. Signalling apparatus as in claim 1 wherein:
   said pulse stretching means responds to input pulses applied thereto having pulse width greater than a first value and less than a second value for producing an output having a duration substantially equal to said second value; and
   said pulse stretching means responds to input pulses applied thereto having pulse width greater than said second value for producing an output having a duration substantially equal to the pulse width of an input pulse applied thereto.

3. Signalling apparatus as in claim 2 wherein: said pulses stretching means includes a pair of cascaded monostable multivibrators, each multivibrators including a NAND gate and inverting means connected in a feedback configuration.

References Cited

UNITED STATES PATENTS

| | | | |
|---|---|---|---|
| 2,892,083 | 6/1959 | Norris | 328—58 |
| 3,426,218 | 2/1969 | Baynard | 328—58 XR |
| 3,437,928 | 4/1969 | Baker et al. | 324—72.5 XR |

RUDOLPH V. ROLINEC, Primary Examiner

E. F. KARLSEN, Assistant Examiner

U.S. Cl. X.R.

324—72.5, 133; 340—252

UNITED STATES PATENT OFFICE
CERTIFICATE OF CORRECTION

Patent No. 3,543,154                    Dated November 24, 1970

Inventor(s) Gary B. Gordon

It is certified that error appears in the above-identified patent and that said Letters Patent are hereby corrected as shown below:

Column 1, line 62, after "provide", insert -- input protection against high applied voltages. High --;

Column 2, line 40, "inputs" should read -- input pulses --;

Column 4, line 11, "pulses" should read -- pulse --.

SIGNED AND
SEALED
FEB 9 1971

(SEAL)
Attest:

Edward M. Fletcher, Jr.
Attesting Officer

WILLIAM E. SCHUYLER, J
Commissioner of Patent